United States Patent [19]
Schmidt, III

[11] Patent Number: 5,853,227
[45] Date of Patent: Dec. 29, 1998

[54] STRUCTURE FACILITATING LUBRICATION OF WHEEL BEARINGS

[76] Inventor: John W. Schmidt, III, 26 Cypress Dr., Palm Harbor, Fla. 34684

[21] Appl. No.: 770,893

[22] Filed: Oct. 30, 1996

[51] Int. Cl.[6] .................................................. F16C 33/10
[52] U.S. Cl. ........................ 301/5.7; 301/108.1; 384/462
[58] Field of Search ........................ 301/5.3, 5.7, 108.1, 301/110.5, 124.1, 110.6; 305/119; 384/322, 370, 374, 380, 381, 382, 383, 384, 475, 93, 241, 307, 311, 462, 473, 474

[56] References Cited

U.S. PATENT DOCUMENTS

| | | | |
|---|---|---|---|
| 1,824,086 | 9/1931 | Knox | 305/119 X |
| 1,963,592 | 6/1934 | Pribil | 301/5.7 X |
| 2,723,168 | 11/1955 | Carroll | 384/380 |
| 2,774,638 | 12/1956 | Spanjer | 305/119 X |
| 4,549,822 | 10/1985 | Crates | 384/462 |
| 5,028,058 | 7/1991 | Olson | 301/5.7 X |

FOREIGN PATENT DOCUMENTS

| | | | |
|---|---|---|---|
| 1001169 | 12/1953 | Germany | 301/5.7 |

*Primary Examiner*—Russell D. Stormer
*Attorney, Agent, or Firm*—Harold D. Shall

[57] ABSTRACT

A wheel, wheel bearing and axle assembly wherein a cleaning and lubricating fluid passageway is provided axially into the outer end of the axle bolt of the assembly and through the latter radially outwardly through a passageway through a wheel bearing spacer carried by the axle bolt and between the latter and a shroud member surrounding the spacer so that the fluid is directed to the bearings on side of the spacer.

14 Claims, 4 Drawing Sheets

STRUCTURE FACILITATING LUBRICATION OF WHEEL BEARINGS

BACKGROUND OF THE INVENTION

1. Field of the Invention

This invention relates to the structure of wheel bearing and axle assemblies for the wheels of in-line roller skates and other wheeled devices having wheels of similar structure and more particularly to such a structure wherein a path is provided in the assembly for the passage therethrough of cleaning solution and lubricant so that shielded bearings may be cleaned without disassembling the axles and bearings from the wheel assembly.

2. Description of the Art

Skating in areas wherein the wheel bearings of the skates can become contaminated with water and dirt has become more common in recent years with the advent of in-line roller skates. The bearings used in in-line skates are normally shielded bearings rather than sealed bearings because of the lower rolling resistance of shielded bearings as opposed to sealed bearings. Shielded bearings are subject to the intrusion of water and dirt contamination. Also, with normal use lubrication in these bearings tends to work out through the clearance between the inner race and the shield.

The present method of bearing maintenance is to replace the bearing when it needs cleaning and/or lubrication or else disassembling the bearing from the wheel and axle, cleaning the bearing in a solvent, lubricating the bearing and then reassembling the bearing, wheel and axle. Replacement is cost expensive and this method of cleaning and lubricating is time expensive.

Patents, such as U.S. Pat. Nos. 357,579; 355,399; 348,961 and 330,097 while being directed toward the lubrication of roller skate wheels, do not provide a flushing path for solvent as well as a lubricating path as does my invention.

SUMMARY OF THE INVENTION

The structure of the present invention facilitates the cleaning and lubrication of these shielded wheel bearings so that the task can be effectively accomplished without disassembly of the axle, bearing, and wheels. To this end, an axially extending opening or path is provided in the axle and extends inwardly to a location between the spaced wheel bearings. The path then extends radially through the spacer between the bearings, which spacer is shrouded by an annular sleeve in a close but slightly spaced relationship to the spacer. The spacer and sleeve extend axially outwardly to engage the inner race of the bearings. Cleaner forcefully injected into the path from the outer end thereof and through the spacer is directed axially outwardly where it flushes the bearings and escapes through the bearing shield carrying the old lubricant and contaminates therewith. New lubrication can then be force through this same path until the bearings are filled with fresh clean lubricant.

The radial opening in the spacer which directs the lubricant to the annular space between the spacer and the sleeve present the cleaner and the subsequent lubricant about the entire circumferential face of the bearing which is a great advantage over single point application since the flushing and lubricating action will be circumferentially complete.

The sleeve may be substantially rigid, in which case there would be a slight space between the sleeve and the spacer. Another construction is to make the sleeve of resilient material, in which case it can snugly fit the circumference of the spacer and thereby act as a seal for the path through the spacer when materials are not being forced therethrough. During cleaning and lubrication, the elastic character of the resilient material allows it to expand as a result of the pressure and the cleaner or lubricant can pass between the sleeve and the spacer to reach the bearings.

DETAILED DESCRIPTION OF A PREFERRED EMBODIMENT

Figure 1:
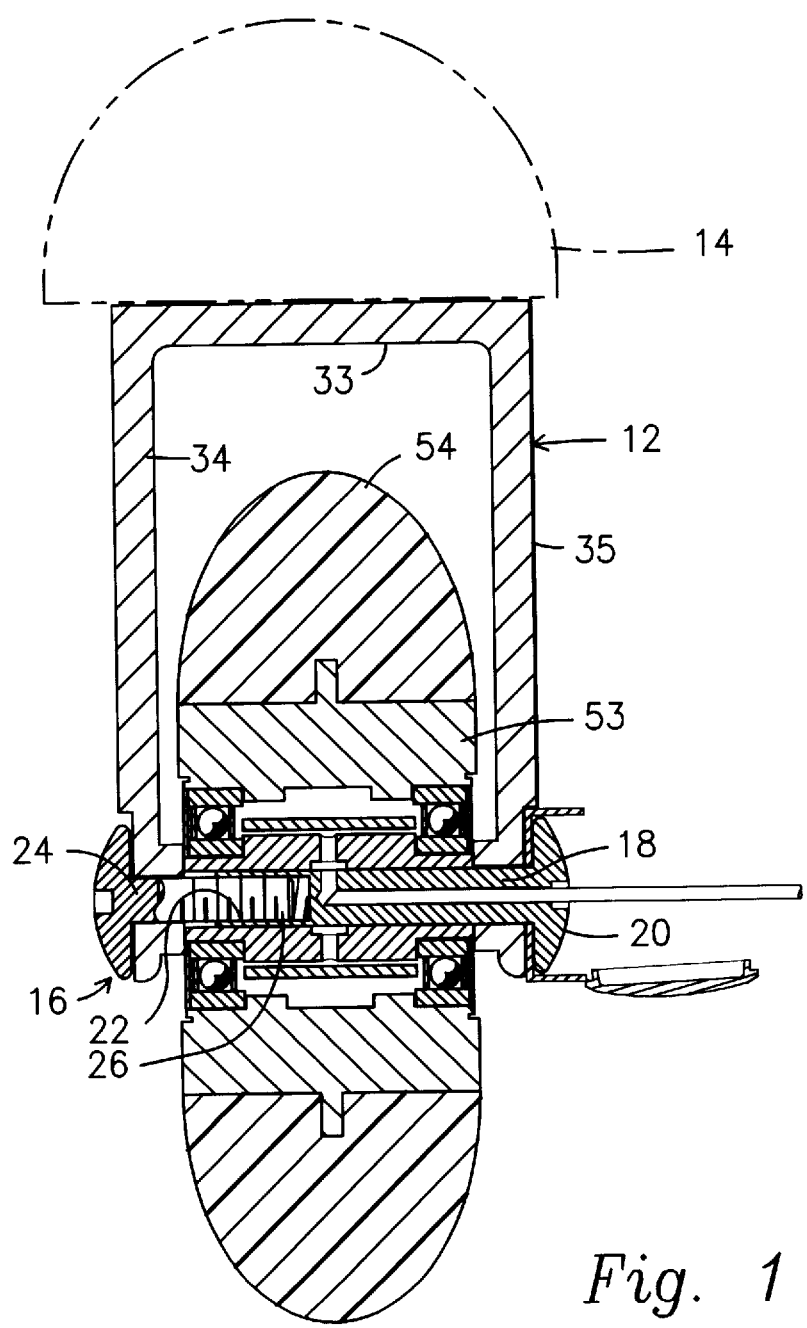
FIG. 1 is an elevated end view in cross section of a wheel assembly according to this invention.
Figure 3:
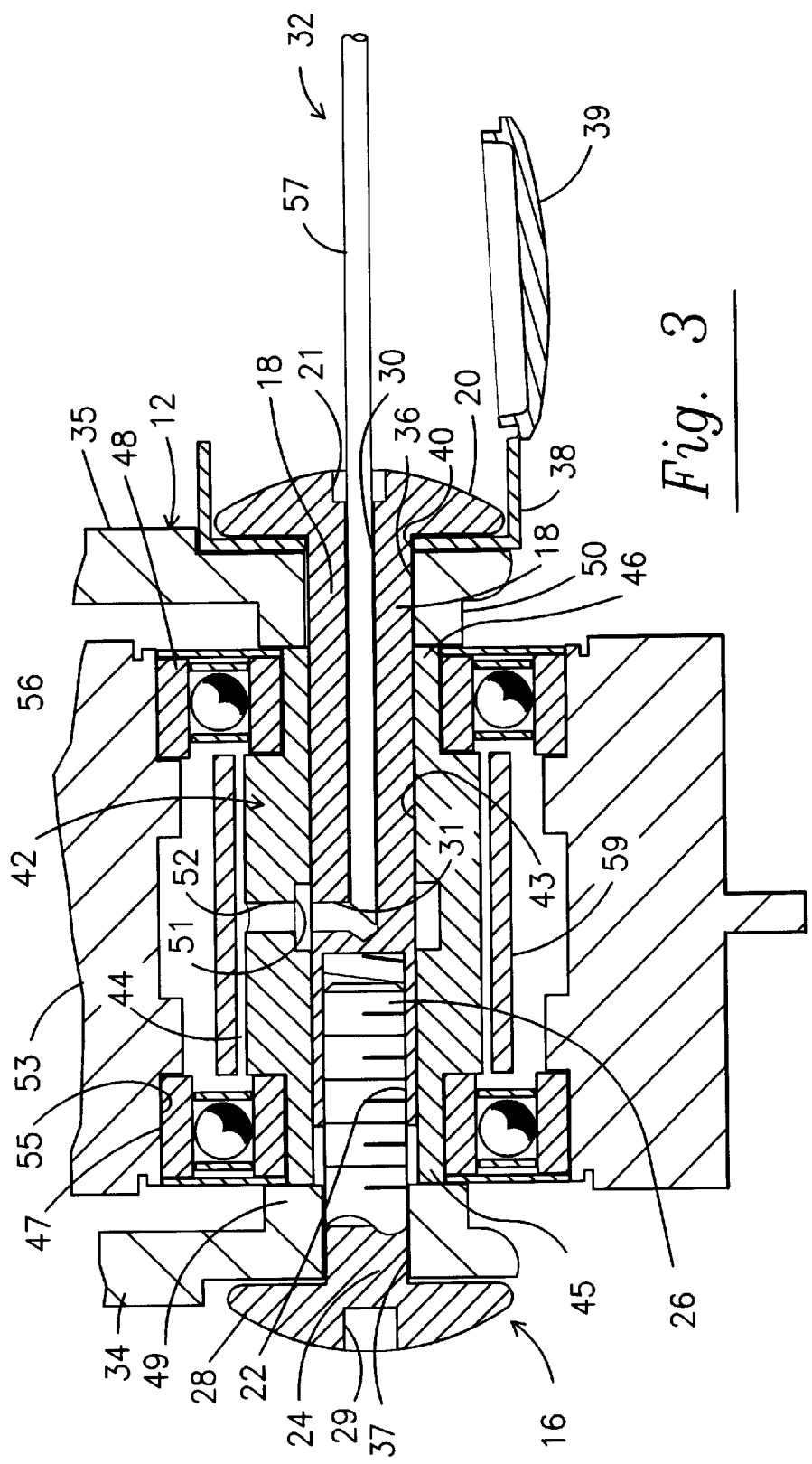
FIG. 3 is a an enlarged fragmentary view of a portion of the embodiment of FIG. 1.

Referring now to the drawings, and more particularly to FIGS. 1, and 3, a common axle structure is shown incorporating the modification of this invention.

A bracket, axle and wheel assembly is shown generally at 10, with the bracket portion 12 of the assembly 10 being operatively connected to the lower surface of the using device, in this case the underside of the sole of a shoe 14. The bracket 12 straddles and mounts both ends of the an axle bolt shown generally at 16. The axle bolt 16 is of two piece construction and has an internally threaded end 18 on the right side thereof, which end has an enlarged right end or head 20 and its left end is internally threaded at 22. The axle bolt 16 has a left end portion 24, the right end of which is externally threaded at 26, and is threadedly received in the internal threads 22 of the right end 18 of the axle bolt 16. The left end of the left bolt portion 24 has an enlarged head 28 with an allen wrench opening 29 therein. The head 20 of the right end 18 of the axle bolt 16 has an allen wrench opening 21, in the center of which is an axially extending opening or bore 30 which forms a part of a cleaning fluid-lubricant passageway shown generally at 32; the bore 30 extending inwardly to terminate at approximately the center of the axle bolt 16. A radial bore 31 extends from the inner end of the bore 30 to the surface of the right end 18 of the axle bolt 16, which bore is also a part of the passageway 32.

The bracket 12 is generally inverted "U" shaped, as seen in cross section, with an upper securing portion 33 and a pair of depending legs, a left leg 34 and a right leg 35. The right leg 35 has an opening 36 adjacent the lower end thereof and the left leg 34 has an opening 37 adjacent the lower end thereof. The opening 37 receives the neck portion of the left end 24 of the bolt 16 with the head 28 securely tightened thereagainst. The right leg opening 36 receives therein the right end 18 of the bolt 16. An annular cup shaped recessed member 38, with a securable cap 39 thereon and a central bore 40 therein, has its bore 40 received about the neck of bolt 18 and is compressed between the head 20 of the bolt 18 and the outer surface of the leg 35 of bracket 12. The cap 39 may be securely closed on the recess member 38 to thus protect the opening 30 from the ingress of contaminants.

A bearing mounting and spacer member 42 has central axle bore 43 therein closely receiving the axle bolt 16. The member 42 has a central enlarged cylindrical portion 44 and a left 45 and a right 46 cylindrical end of smaller diameter than the central portion 44 extending axially outwardly from the portion 44 and mounting thereon, respectively the left bearing 47 and right bearing 48. The bearings 47 and 48 are of the readily available and conventional shield type, with the shields facing outwardly and with a slight space at the inner diameter of the shields. The central portion 44 abuts and spaces the inner sides of the inner races of the bearings 47 and 48 while the outer sides of the inner races of bearings 47 and 48 are abutted by, respectively, an shoulder 49 and 50 on the inner side of the legs 34 and 35. As the bolt ends 18 and 24 are tightened, the shoulders 49 and 50 compress against the outer ends the spacer 42 to retain the same from rotating relative to the bolt 16 so that the axle bolt and spacer function in a unitary manner as an axle bolt means to mount the wheel and bearings relative to the bracket 12. The bore 43 in the spacer 42 has an annular groove 51 formed therein which is confluent with the radial bore 31 in the bolt 16 regardless of the circumferential orientation thereof and a radial bore 52 in the spacer 42 leads from the groove 51 to the surface of the cylindrical portion 44, which groove 51 and bore 52 are a portion of the passageway 32.

An annular bushing portion 53, of a conventional skate wheel 54, has annular grooves 55 and 56 on the outer ends thereof, respectively receiving the outer races of bearings 47 and 48 in a conventional manner. A cylindrical sleeve 59 overlies the cylindrical portion 44 of the spacer 42 and forms a shroud means therefore. If the cylindrical sleeve 59 is of rigid material, it is slightly spaced from the spacer 42 so that the space can function as a part of the passageway 32 to thus conduct cleaner or lubricant to the bearings 47 and 48. If the sleeve 59 is made of a resilient elastomeric material, it can closely fit the portion 44 and act as a seal when there is no pressure thereon and when there is pressure in the passageway 32, it will flex outwardly sufficiently to function as a part of the passageway.

Figure 4:
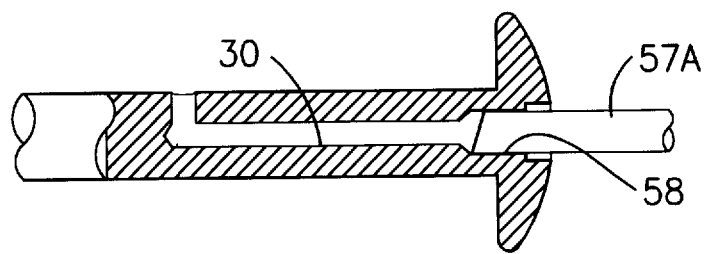
FIG. 4 is an enlarged fragmentary view of the axle end of FIG. 3 showing a different structure of the opening in the end of the axle.
Figure 5:
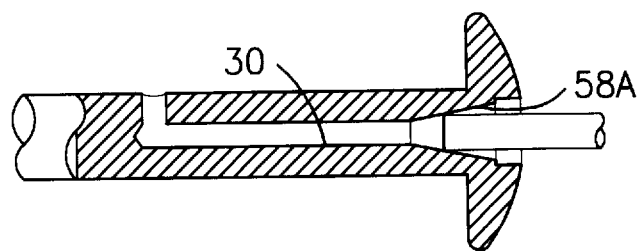
FIG. 5 is a view like FIG. 4 of yet another structure of said opening.

A supply pipe 57 is received in the bore 30 to thereby direct thereinto either cleaner or lubricant from a pressurized supply thereof. In FIG. 4, a straight sided counter bore 58 is formed in the opening of the bore 30 so that a supply pipe 57A, having a chamfered end, maybe fully inserted therein without the inner end of the supply pipe being blocked. In FIG. 5, a tapered counterbore 58A is formed in the opening of the bore 30 so that a supply pipe 57 can be inserted therein without the inner end thereof being blocked.

Figure 2:
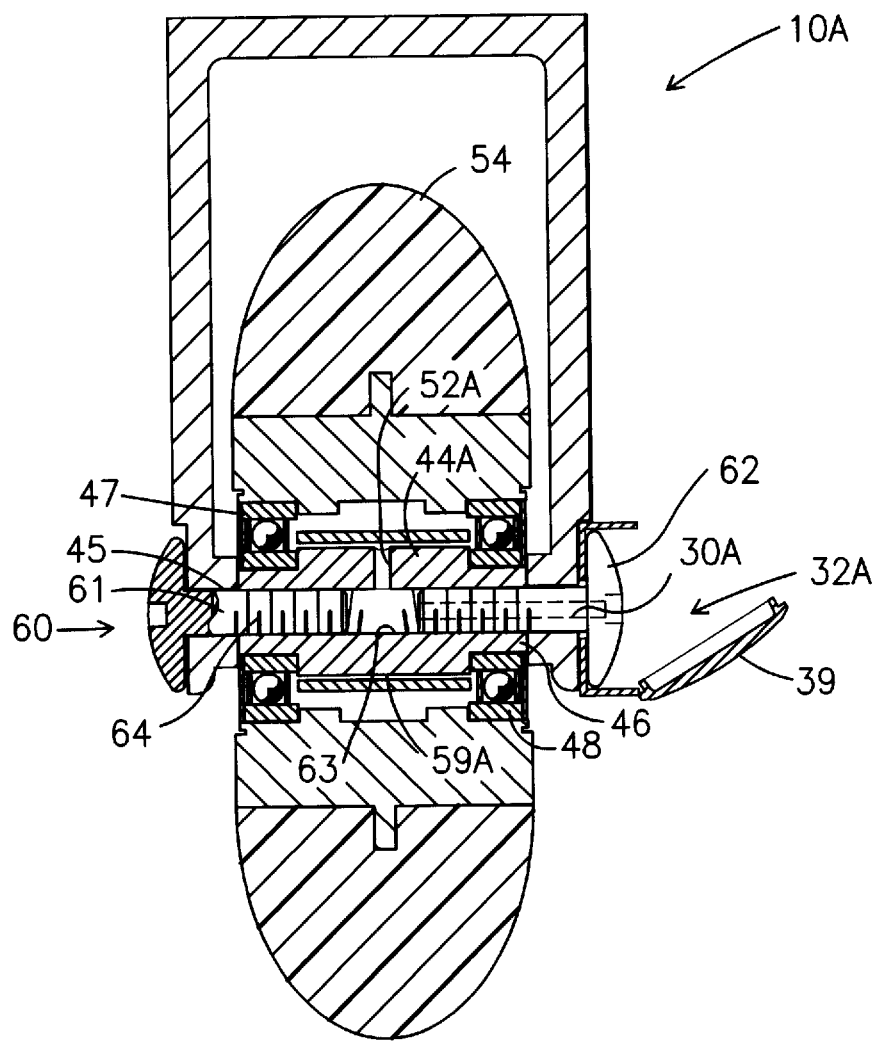
FIG. 2 is a view taken like FIG. 1 of a second embodiment.

Referring now to FIG. 2, wherein like parts will be given like numbers and only the differences between FIG. 1 and FIG. 2 will be described.

The bolt 60 is of two piece construction, with the left and right ends 61 and 62 of the bolt 60 both being of externally threaded male configuration. The spacer 42A has a bore 63 and both ends thereof are internally threaded as shown at 64, and receive the threaded inner ends of the left 61 and right 62 ends of the bolt 60, whereby the bolt 60 and the spacer 42A do not rotate relative to each other and form an axle bolt means and an enlarged central cylindrical portion 44A of the spacer 42 functions to abut and space the bearings 47 and 48, while the left 45 and right 46 ends of the spacer mount the inner races of the bearings 47 and 48 respectively.

The right end 62 of the bolt 60 has an axial opening 30A extending therethrough to reach the space 65 between the left 61 and right 62 ends of the bolt 60. The spacer 44A has a radially extending opening 52A which is constantly confluent with the opening 30A and these openings form a part of the passageway 32A through which cleaner and lubricant can be injected into the wheel and axle assembly 10A. A cylindrical sleeve 59A surrounds the cylindrical portion 44A whereby the space therebetween can function as a part of the passageway 32A directing fluid to the bearings 47 and 48 to thereby clean and lubricate them.

Although the above description relates to presently preferred embodiments, numerous changes can be made therein without departing from the scope of this invention as claimed in the following claims.

What is claimed is:

1. A wheel and axle assembly incorporating a cleaning and lubricating passageway comprising in combination, (a) a wheel having a central bore, (b) an axle bolt means for carrying said wheel with said bolt means having an outer end, (c) said wheel carrying internally a pair of spaced shielded bearings with the inner race of said bearings non-rotatably mounted on said bolt means and the outer race of said bearings non-rotatably mounted in said central bore of said wheel, (d) said wheel being carried by said bearing means for rotation relative to said axle bolt means, (e) said bolt means including spacer means non rotatably mounted thereon intermediate said pair of spaced bearings for maintaining the space therebetween, (f) a cleaning and lubricating fluid passageway extending inwardly from said outer end of said bolt means and radially outwardly through said spacer means to the space between said bearings, and (g) shroud means spaced from said central bore of said wheel and surrounding the periphery of said spacer means for directing fluid from said passageway in a direction axially outwardly into said bearing races.

2. An assembly according to claim 1 wherein said bolt means is of two piece construction, with said two pieces including thread means interconnecting the same.

3. An assembly according to claim 2 wherein said bolt means is of two piece construction and said wheel assembly is mounted in a bracket, said bracket is of generally inverted "U" shape configuration when seen in cross section and has aligned openings in the lower end thereof, said bracket receives said axle bolt means in said aligned openings and said spacer means axially abuts said bracket means.

4. An assembly according to claim 2 wherein said thread means is disposed at a location within said spacer means.

5. An assembly according to claim 4 wherein said thread means has female portions within said spacer means and said bolt means has male thread means cooperating therewith.

6. An assembly according to claim 4 wherein said spacer means has a central enlarged cylindrical portion having axially spaced ends and has on each of its axial ends a smaller cylindrical portion and said bearing races are mounted on said smaller cylindrical portions.

7. An assembly according to claim 6 wherein said shroud means is a hollow cylindrical member.

8. An assembly according to claim 1 wherein said spacer means is cylindrical in shape and said shroud means is a hollow cylindrical member surrounding said spacer means.

9. An assembly according to claim 8 wherein said shroud means is made of substantially rigid material and is slightly spaced from the periphery of said spacer means.

10. An assembly according to claim 1 wherein said outer end of said bolt means includes seal means for selectively allowing cleaning and lubricating fluid to be injected into said passageway and for sealing said passageway at other times.

11. A wheel and axle assembly comprising
   (a) an axially elongated axle bolt means having an outer end and including a bearing abutting spacer means having a peripheral surface,
   (b) a wheel having a central bore and having mounted in said bore a wheel bearing which in turn is mounted on said axle bolt means whereby said wheel can rotate relative to said axle bolt,
   (c) passage means in said axle bolt means entering the same from said outer end thereof and extending axially thereinto,
   (d) said axle bolt means including a radially extending opening confluent with said passage means and opening through said peripheral surface of said spacer means,
   (e) shroud means spaced from said central bore and surrounding said spacer means and providing a path between said shroud means and said spacer means for the passage of fluid from said passage means and for directing such fluid to said bearing.

12. A wheel, having a central bore, and axle assembly comprising
   (a) an axially elongated axle bolt means having an axial outer end and including a bearing abutting spacer means,
   (b) a wheel carrying wheel bearing having an inner and an outer race with bearings therebetween and with said inner race mounted on said axle bolt means and said outer race mounted in said central bore whereby said wheel can rotate relative to said axle bolt,
   (c) first passage means in said axle bolt means entering the same from said outer end thereof and extending axially thereinto for carrying fluid therein,
   (d) second passage means confluent with said first passage means and extending therefrom to the vicinity of said wheel bearing, and shroud means surrounding said spacer means and with the periphery thereof spaced from the central bore of said wheel with the space between said shroud means and said spacer means forming a portion of said second passage means.

13. A wheel and axle assembly according to claim 12 wherein said second passage means includes a radially extending portion and a delivery portion extending axially from said radially extending portion.

14. A wheel and axle assembly incorporating a cleaning and lubricating passageway comprising in combination,
   (a) a wheel having a central bore,
   (b) an axle bolt means for carrying said wheel with said bolt means having an outer end,
   (c) said wheel carrying internally a pair of spaced shielded bearings with the inner race of said bearings non-rotatably mounted on said bolt means and the outer race of said bearings non-rotatably mounted in said central bore of said wheel,
   (d) said wheel being carried by said bearing means for rotation relative to said axle bolt means,
   (e) said bolt means including spacer means non rotatably mounted thereon intermediate said pair of spaced bearings for maintaining the space therebetween,
   (f) a cleaning and lubricating fluid passageway extending inwardly from said outer end of said bolt means and radially outwardly through said spacer means to the space between said bearings, and
   (g) shroud means spaced from said central bore of said wheel and surrounding the periphery of said spacer means for directing fluid from said passageway in a direction axially outwardly into said bearing races, said shroud means being made of an elastomeric material and closely fitting the periphery of said spacer member.

* * * * *